March 17, 1970          F. SOKOL          3,500,618
EXTENDED AREA AIR FILTER
Filed June 7, 1968          2 Sheets-Sheet 1
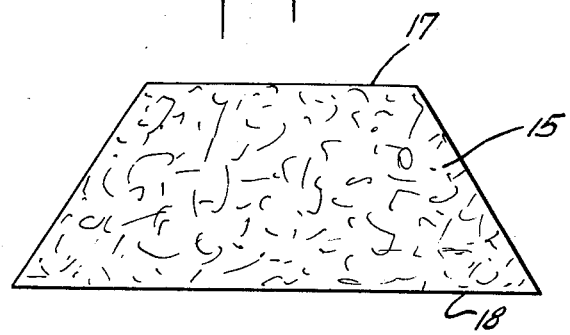
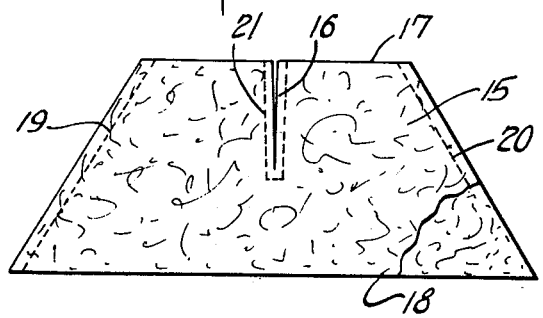
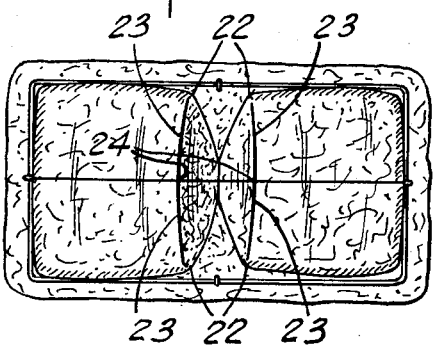
INVENTOR
FRANK SOKOL
BY
ATTORNEY March 17, 1970  F. SOKOL  3,500,618
EXTENDED AREA AIR FILTER Filed June 7, 1968  2 Sheets-Sheet 2

INVENTOR
FRANK SOKOL
BY
ATTORNEY

United States Patent Office 3,500,618
Patented Mar. 17, 1970

3,500,618
EXTENDED AREA AIR FILTER
Frank Sokol, Fords, N.J., assignor to Johnson & Johnson, a corporation of New Jersey
Filed June 7, 1968, Ser. No. 735,384
Int. Cl. B01d 39/04, 39/16
U.S. Cl. 55—484         5 Claims

ABSTRACT OF THE DISCLOSURE

An extended area air filter comprising a pair of substantially co-extensive trapezoids of fibrous batts. Each trapezoid having a slit starting at substantially the mid-point of the shorter, parallel side and extending perpendicular therefrom a portion of the distance towards the longer parallel side. The trapezoidal batts being secured together at both non-parallel edges and along both sides of said slit. Each trapezoid is folded upon itself at the mid-point along its shorter parallel side between said slit and non-parallel edge and sealed together along its shorter parallel side to form a pair of truncated ellipsoidal conical sections collapsed and sealed at their top position.

---

This invention relates to air filters and more particularly to filters of the extended area type. In order to improve the efficiency of the filtering systems used in air conditioning and heating systems it is very often desirous to increase filter capacity. In most heating and cooling systems there are frames installed in the ductwork for holding air filters. To increase filtration capacity one method is to increase the cross-sectional area of this ductwork so that more filter area may be used. However, this reduces air flow and otherwise harms the efficiency of the cooling and heating system. One method for increasing filter efficiency without changing air flow or ductwork is to utilize extended area filters which fit into the same frame as the standard straight filter. A V shaped filter is such an extended area filter. There are also other shapes which may be used.

I have developed a new extended area filter which greatly improves filtering efficiency by increasing the area without harming the pressure drop across the filter and which is readily manufactured from flat batts of air filter media without waste. Furthermore, the construction of my new extended area filter is such that when in operation it will not block upon itself but is forced into such a configuration as to make use of the entire filter area. Also, my new extended area filters may be placed in exactly the same type of frames holding previously extended area filters or the flat type filter.

Generally these filters are placed in rectangular frames of metal or plastic strips. These rectangular frames hold the downstream side of the filter so that the filter extends into the upstream side of the filter. In operation, the configuration of my new filter is such that it is held in a completely open position and will not block upon itself or collapse.

In accordance with the present invention my new extended area filter comprises a pair of air filter batts. Each batt is substantially in the shape of a trapezoid and the batts are coextensive. The trapezoidal batts are both slit or cut from the mid-point along their shorter parallel side a portion of their width towards the longer parallel side with the slit being perpendicular to the parallel sides. The trapezoidal batts are sealed together along their non-parallel sides and along their edges about the slit. Each batt is folded upon itself at the mid-point between the slit and the non-parallel edge along the shorter parallel side and sealed together at the shorter parallel side. When this filter is in use the downstream or entering portion of the filter is formed of the longer parallel sides. The extended area which enters into the upstream portion of the duct are two openings which are defined and sealed along the shorter parallel side of the slit and with the non-parallel edge. These openings may be characterized as truncated, ellipsoidal, conical sections which are collapsed and sealed at their top portions.

If desired more than one such filter configuration may be used to form the extended area filter of the present invention. This may be done by taking two trapezoidal figures as described above which are substantially coextensive and sealing them together along one of the longer parallel edges of each filter. They may be sealed together either in a straight configuration along this edge or in a circular or partial arc configuration to improve the extension of the filter into the filter frame and ductwork.

The invention will be more fully described when taken in conjunction with the following detailed description accompanying the drawings, wherein:

FIGURE 1 is a plane view of the starting trapezoidal fibrous batt without the slit;

FIGURE 2 is the batt of FIGURE 1 sealed about the slit and along its non-parallel edges;

FIGURE 3 is a top view of the air filter batt of the present invention;

Figure 4:
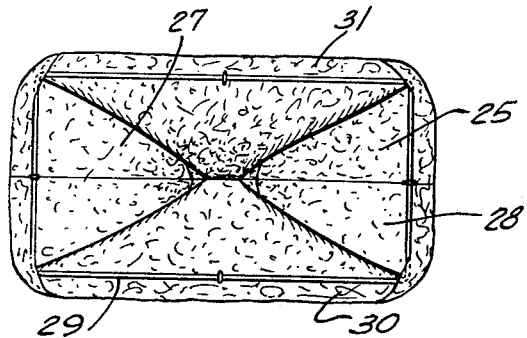
FIGURE 4 is a bottom view of the air filter batt of the present invention.

Referring to FIGURES 1 and 2. In FIGURE 1 there is shown a fibrous batt 15 having a trapezoidal shape. The batt is slit 16 a portion of its width starting from the shorter parallel side 17 and extending perpendicularly towards the longer parallel side 18. In FIGURE 2 two of the trapezoidal batts of FIGURE 1 are placed together. These batts are substantially co-extensive. The batts are sealed together along their non-parallel edges 19 and 20 and about the slit 21.

As shown in FIGURE 3 each batt is folded upon itself at its mid-point 22 between the slit and the non-parallel edge and sealed together along this line 23 of its shorter parallel side. The batts are further sealed where the shorter parallel side of one batt meets the shorter parallel side of the other batt 24. This is more clearly shown in FIGURE 3. FIGURE 4 shows this air filter batt 25 from the bottom view showing the two extended areas 27 and 28 which form the extended area of the filter. As shown in FIGURE 4 a support frame 29 or wire support is placed about the outer periphery formed by the opened longer parallel sides 30 and 31 to hold this portion of the filter in its fully opened condition. This wire frame is also used to support and hold the filter in the frame in operation. The frame stiffens the filter and makes it easier to handle. Though a wire rod is shown other support means or stiffening means may also be used in order to open the longer parallel sides to form the downstream opening of the filter.

The air filter batts may be any of the standard air filter batts which are loose, fluffy masses of fibers such as rayon, nylon, polyester, acrylic, Fiberglas, or any of the standard fibers used for filtering air. The fibers are generally laid in a random, three dimension configuration and may be bonded or unbonded as desired.

In many instances a thermoplastic fiber, or a thermoplastic binder, or the combination of both, may be used. The use of thermoplastic fibers and/or binder of course makes the sealing quite simple merely by applying heat along the edges to be sealed. Other methods of sealing in the desired areas may of course be accomplished by stitching, or by applying adhesive along the edges or other well known sealing techniques.

Figure 5:
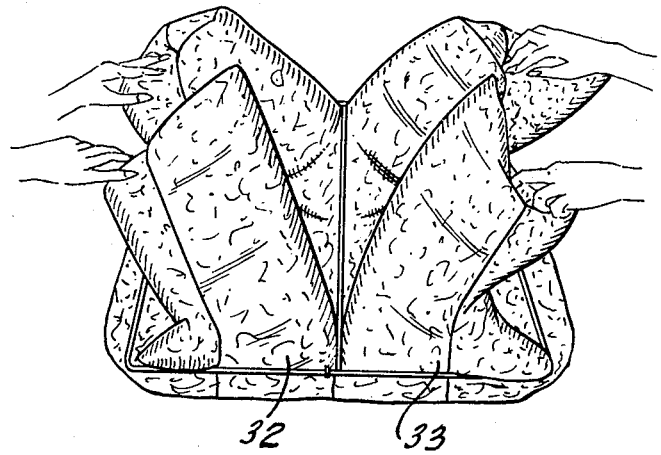
FIGURE 5 is a top view of a pair of air filter batts of the present invention attached together to form an extended air filter.
Figure 6:
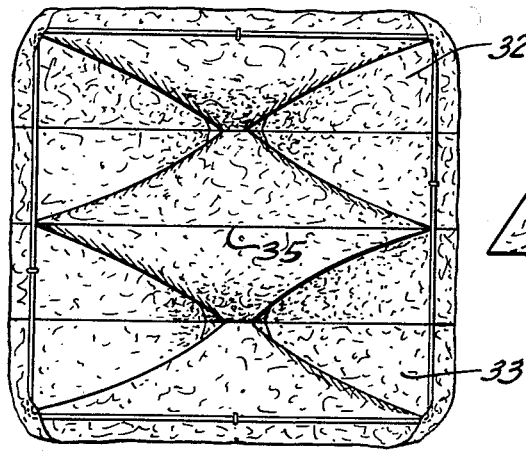
FIGURE 6 is a bottom view of the air filter batt of FIGURE 5.
Figure 7:
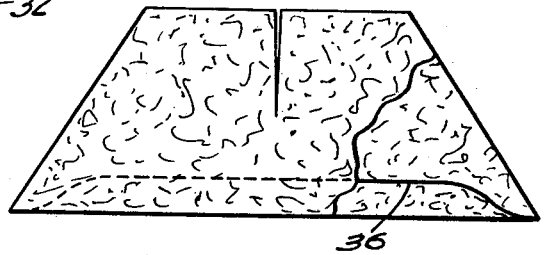
FIGURE 7 is a side view showing the attachment of the two air filter batts of the present invention.

To increase even further the area of the filters of the present invention two or more of the trapezoidal filters 32 and 33 of the present invention may be used in combination. The trapezoidal air filters may be combined as shown in FIGURES 5 and 6. As is more clearly shown in FIGURE 7 the trapezoids are sealed together by sealing one longer parallel side 35 of the other air filter 33. These may be sealed straight across or, to even improve the blooming and extension of the filter in use, may be sealed in a circular configuration or a curved configuration 36 as shown in FIGURE 7.

What is claimed is:

1. An extended area air filter comprising: a pair of substantially co-extensive trapezoids of fibrous batts each trapezoid having a slit starting at its shorter parallel side and extending perpendicular therefrom a portion of the distance towards its longer parallel side, said trapezoidal batts being secured to each other along both non-parallel sides and adjacent the slits along both sides thereof and each trapezoid being folded outwardly at the mid-points along the shorter parallel side between said slit and said non-parallel sides and being sealed together along edges transverse to said shorter parallel side on each side of the slit to seal the shorter parallel side whereby an extended area filter is formed having an opening defined by the longer parallel sides of said pair of trapezoids and having two distended areas in the form of truncated, ellipsoidal, conical sections collapsed and sealed at their top portions.

2. An extended area air filter as defined in claim 1 wherein the fibrous batts contain thermoplastic fibers and the trapezoids are heat sealed together.

3. An extended area air filter as described in claim 1 comprising a pair of such extended area air filters sealed together along a longer parallel side of each filter.

4. An extended area air filter according to claim 1 comprising a pair of extended area air filters of thermoplastic fibers heat sealed together along a longer parallel side of each filter.

5. An extended area air filter according to claim 4 wherein the air filters are sealed together along a curved line extending along a portion of the longer parallel side of each air filter.

References Cited

UNITED STATES PATENTS

| | | | |
|---|---|---|---|
| 1,821,824 | 9/1931 | Woodward | 55—382 |
| 2,774,443 | 12/1956 | Slayter | 55—527 |
| 2,853,154 | 9/1958 | Rivers | 55—341 |
| 3,204,391 | 9/1965 | Schwab | 55—374 |
| 3,273,321 | 9/1966 | Bauder et al. | 55—528 |
| 3,385,039 | 5/1968 | Burke et al. | 55—501 |
| 3,386,231 | 6/1968 | Nutting | 55—528 |
| 3,386,232 | 6/1968 | Gaines | 55—500 |

FOREIGN PATENTS

| | | |
|---|---|---|
| 905,113 | 9/1962 | Great Britain. |

HARRY B. THORNTON, Primary Examiner

BERNARD NOZICK, Assistant Examiner

U.S. Cl. X.R.

55—527